United States Patent
Liou et al.

(10) Patent No.: US 8,165,632 B2
(45) Date of Patent: Apr. 24, 2012

(54) POSITION REPORTING MICROPHONE

(76) Inventors: Henry Liou, Brea, CA (US); David Verne May, San Diego, CA (US); Zbigniew Cyganik, San Diego, CA (US)

( * ) Notice: Subject to any disclaimer, the term of this patent is extended or adjusted under 35 U.S.C. 154(b) by 437 days.

(21) Appl. No.: 11/365,766

(22) Filed: Mar. 1, 2006

(65) Prior Publication Data
US 2007/0021135 A1    Jan. 25, 2007

Related U.S. Application Data

(63) Continuation-in-part of application No. 11/187,181, filed on Jul. 21, 2005.

(51) Int. Cl.
*H04B 1/38* (2006.01)
(52) U.S. Cl. ........... 455/557; 455/404.2
(58) Field of Classification Search .......... 455/575.1, 455/556.1, 457, 518, 562.1, 404.2, 519, 426.1, 455/520
See application file for complete search history.

(56) References Cited

U.S. PATENT DOCUMENTS

| | | | |
|---|---|---|---|
| 5,884,199 A * | 3/1999 | Maki | 455/575.1 |
| 6,912,397 B2 | 6/2005 | Liou | |
| 6,941,147 B2 | 9/2005 | Liou | |
| 7,181,230 B2 * | 2/2007 | Nonoyama et al. | 455/457 |
| 7,251,500 B2 * | 7/2007 | Nakagawa et al. | 455/556.1 |
| 2006/0148468 A1 * | 7/2006 | Mann | 455/426.1 |

OTHER PUBLICATIONS

U.S. Appl. No. 11/187,322, filed Dec. 8, 2005, Henry Liou.
U.S. Appl. No. 11/187,181, filed Nov. 17, 2005, Henry Liou.
U.S. Appl. No. 10/989,195, filed May 5, 2005, Henry Liou.
APRS General Information, Automatic Position, website: http://nwaprs.info/aprsinfo.htm, Mar. 14, 2006, pp. 1-8.
Kenwood, TH-D7A/E Service Manual, Nov. 1998, pp. 4-6.
Inside Track, website: http://www.arrl.org/news/stories/1998/1014/2/, Oct. 14, 1998, pp. 1-2.
Bob Bruninga, APRS Generic Digipeating Satellites for HT and Mobile Satellite Communications, journal, Sep. 24, 1999, pp. 130-142.

* cited by examiner

*Primary Examiner* — Tu Nguyen
(74) *Attorney, Agent, or Firm* — Erik Vieira

(57) ABSTRACT

A position reporting microphone, adapted for use in an existing communication system is disclosed. The position reporting microphone communicatively networks with the existing communication system channels to send and receive information such as for example audio, position, and/or identification information regarding the position reporting microphone.

13 Claims, 3 Drawing Sheets

POSITION REPORTING MICROPHONE

CROSS-REFERENCE TO RELATED APPLICATIONS

This application is a request for continued examination (RCE) application of co-pending U.S. application Ser. No. 11/365,766. This application is related to issued U.S. Pat. No. 6,912,397 to Liou, entitled GPS MICROPHONE FOR COMMUNICATION SYSTEM. This application is also related to issued U.S. Pat. No. 6,941,147 to Liou, entitled GPS MICROPHONE FOR COMMUNICATION SYSTEM. This application is further related to co-pending non-provisional application Ser. No. 11/165,653, filed Jun. 24, 2005 to Liou, entitled SELF-POWERED POSITIONING AND MODEM SYSTEM FOR RADIO/AUDIO COMMUNICATION DEVICE; to co-pending divisional application Ser. No. 11/187,322, filed Jul. 21, 2005 to Liou, entitled GPS MICROPHONE FOR COMMUNICATION SYSTEM; to co-pending divisional application Ser. No. 11/187,181, filed Jul. 21, 2005 to Liou, entitled GPS MICROPHONE FOR COMMUNICATION SYSTEM; to co-pending divisional application Ser. No. 10/989,195, filed Nov. 10, 2004 to Liou, entitled GPS MICROPHONE FOR COMMUNICATION SYSTEM; and, to co-pending divisional application Ser. No. 10/922,742, filed Aug. 19, 2004 to Liou, entitled GPS MICROPHONE FOR COMMUNICATION SYSTEM. All of the U.S. applications described above are hereby incorporated by reference herein, in their entirety, as if set forth in full.

BACKGROUND

1. Field

The present disclosure generally relates to methods and apparatuses for networking in a communication system, and particularly for communicating position information of such apparatuses to the communication system.

2. Related Art

A Global Positioning System (GPS) is a space-based radio positioning network designed to provide users who are equipped with a suitable receiver with position, velocity, date, heading, altitude, quality of fix information, and time information. Developed by the United States Department of Defense, the space-based portion of GPS comprises a constellation of GPS satellites in non-geosynchronous 12 hour orbits around the Earth. A myriad of Global Positioning Satellite ("GPS") capable devices are becoming more readily available in contemporary commercial markets, due to modern public access to GPS.

Personal GPS units allow hikers and mountaineers to navigate difficult and confusing terrain without fear of being lost. Maritime GPS units have been popular for many years now with both recreational and commercial boaters. LoJack® is yet another readily available consumer GPS product that has helped many vehicle owners recover their stolen vehicles. Nearly every high-end vehicle modernly comes equipped from the factory with a GPS navigational tracking system to guide a driver to a target destination.

Civil service providers, such as for example police, firefighters, and other such civil servants have not historically been provided as ready access to GPS networking equipment as their military counterparts. Although civil servants are not exposed to the same measure of danger as their military counterparts, police and firefighters in particular can easily find themselves in dangerous situations wherein a personal GPS network device would help ensure the safety of such an officer or firefighter.

A vast number of currently existing wireless two-way communication systems provide radio communications channels to approved users. Indeed, virtually every metropolitan area is laden with a plethora of wireless network infrastructure. A need exists to provide such currently existing communications systems with a personal GPS device, capable of "backfitting" to use the already existing communications channels to provide a cost effective GPS position tracking system.

Therefore, the present teachings provide such a personal GPS apparatus and system, which is robust, fast, and cost-effective and easily implemented in a currently existing two-way radio communications system.

SUMMARY

In one embodiment, a system for communicating information in a wireless network between at least one user and a communication system is disclosed. The system generally comprises a position reporting microphone and a connector element. The position reporting microphone includes a speaker-microphone set, comprising a speaker element, operatively coupled to a microphone element, and a Push-to-Talk ("PTT") circuit member, electrically connected to the microphone element, wherein the PTT circuit member is adapted to electrically activate the microphone element. The position reporting microphone further includes a position acquisition controller, operatively connected to the speaker-microphone set, comprising a position information receptor, adapted to receive positioning data from at least one external transponder system, and a signal converter, operatively coupled to the position information receptor, wherein the signal converter converts the positioning data received by the position information receptor into a quantity of positioning digital data. The position reporting microphone further includes a data manager element, electrically coupled to the position acquisition controller, wherein the data manager is adapted to parse the quantity of positioning digital data into a digital format suitable for use by a baseband audio signal processor. Also, the position reporting microphone includes a baseband audio signal processor element, electrically coupled to the data manager element, adapted to receive the suitably formatted quantity of positioning digital data, wherein the baseband audio signal processor element is adapted to generate a composite signal. In one embodiment, the position information receptor comprises a ground plane antenna.

BRIEF DESCRIPTION OF THE DRAWINGS

Embodiments of the present disclosure will be more readily understood by reference to the following figures, in which like reference numbers and designations indicate like elements.

DETAILED DESCRIPTION

Figure 1:
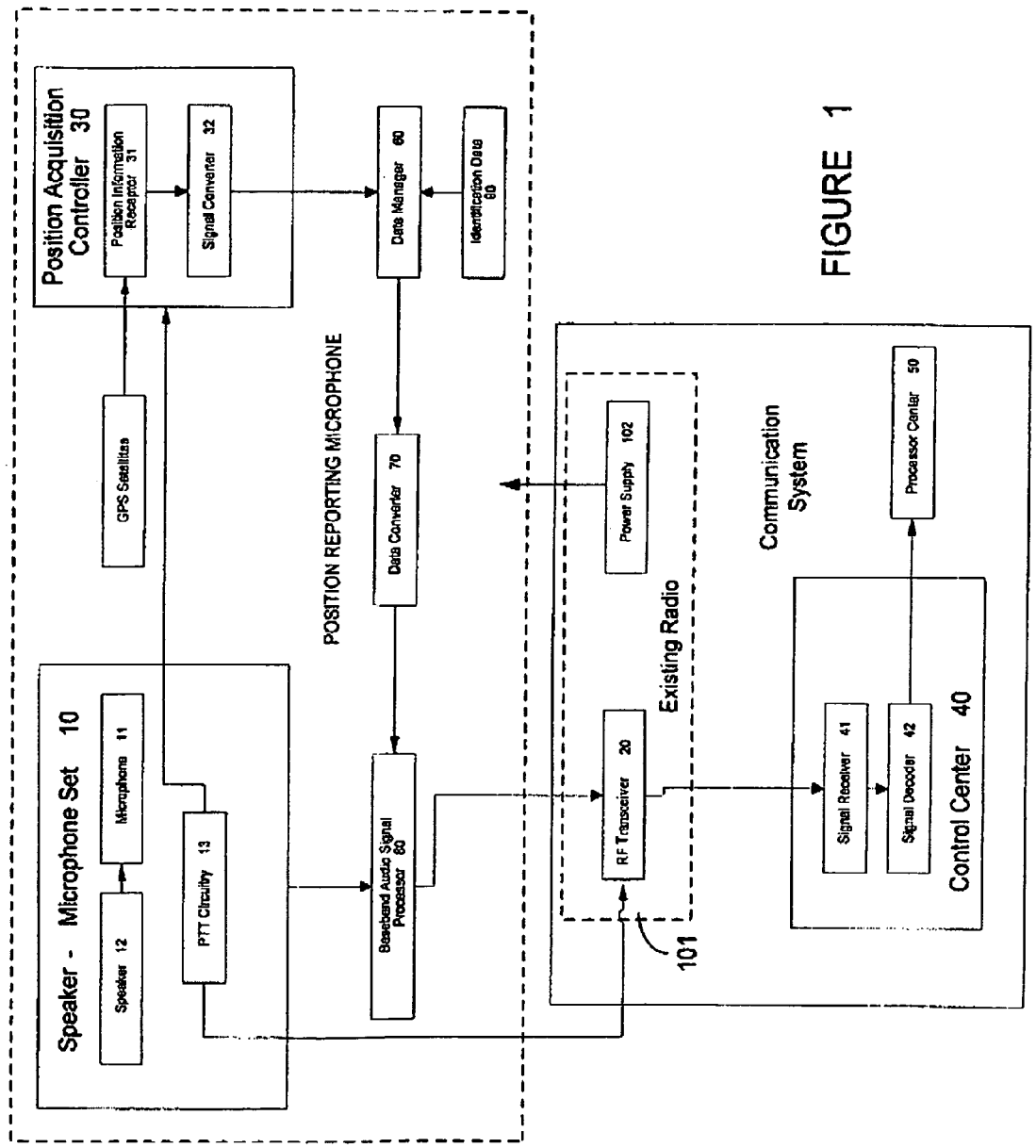
FIG. 1 is a block diagram of a position reporting microphone for a communication system, in accordance with the present teachings.
Figure 2:
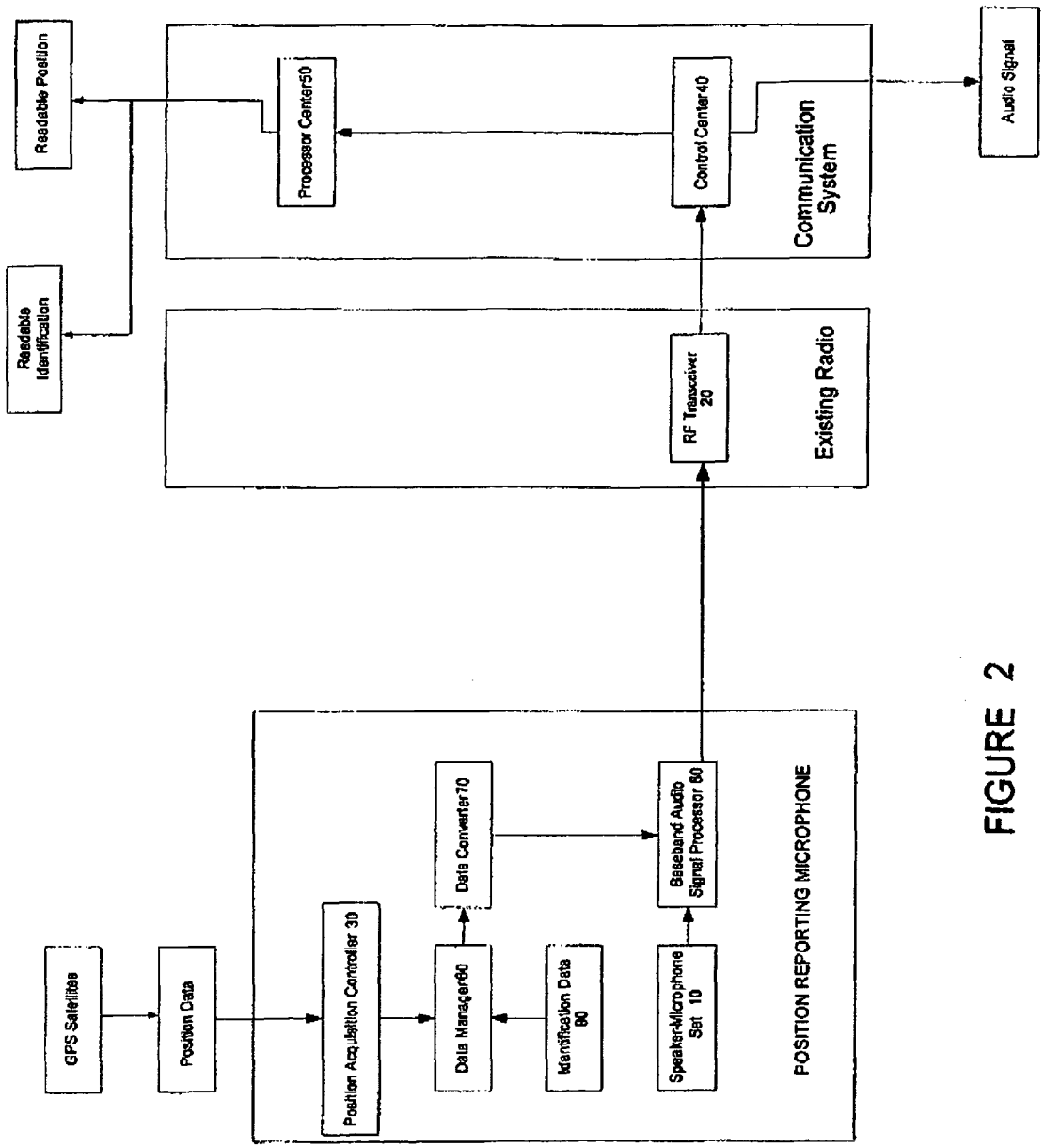
FIG. 2 is a flow diagram illustrating transmission signal pathways between a position reporting microphone and a communication system, in accordance with the present teachings.
Figure 3:
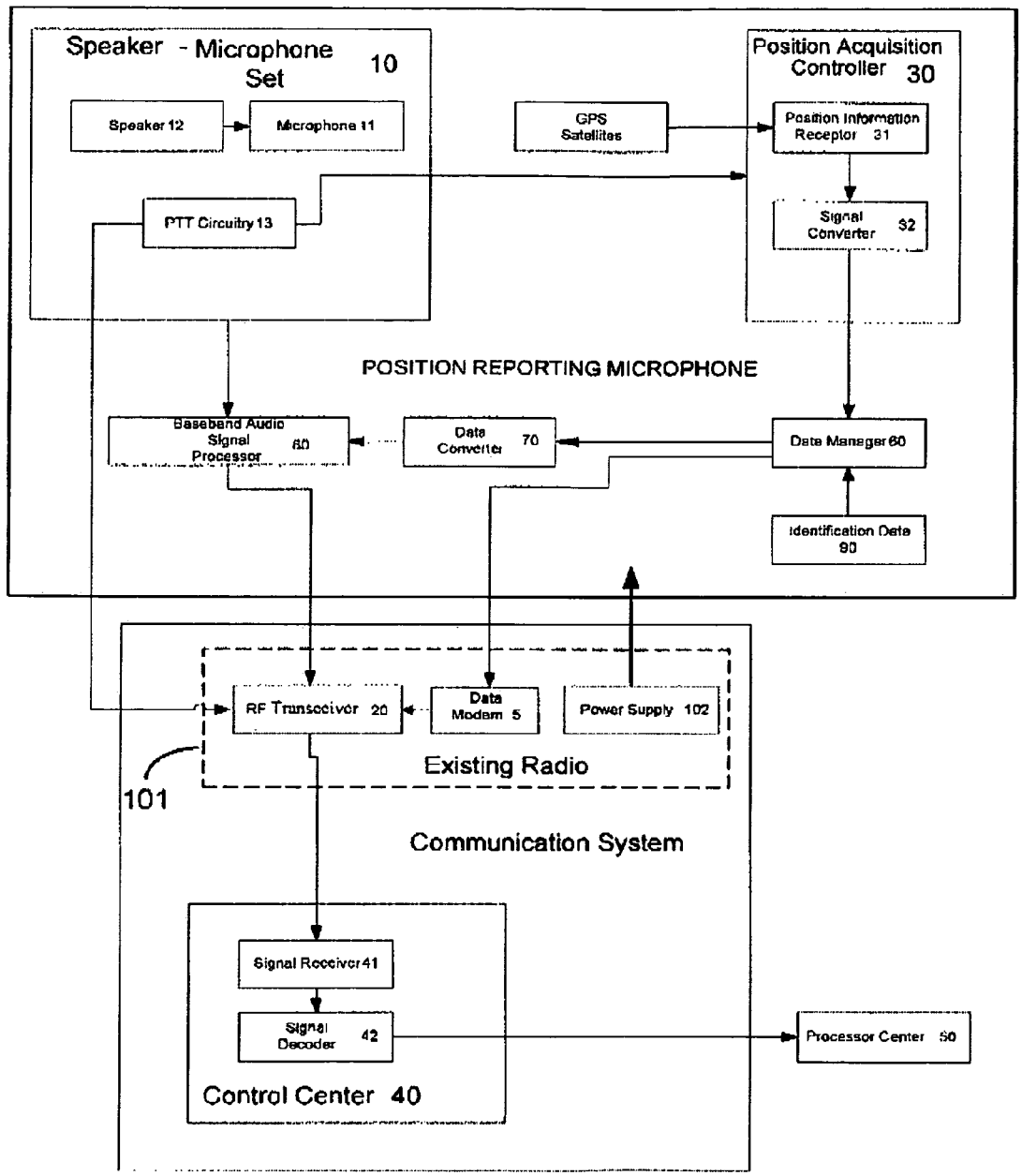
FIG. 3 illustrates a block diagram of an alternate embodiment of the position reporting microphone, according to the present teachings.

Referring to FIGS. 1-3 of the drawings, a position reporting microphone for networking with a communication system according to an illustrative exemplary embodiment of the present teachings is shown. In one exemplary embodiment, the position reporting microphone comprises a speaker-microphone set 10, a position acquisition controller 30 operatively connected with the speaker-microphone set 10, and a baseband audio signal processor 80, operatively connected to the position acquisition controller 30 and further connected to the speaker-microphone set 10. The position reporting microphone is operatively coupled to the communication system via an RF transceiver 20. In one embodiment, the position reporting microphone comprises a GPS microphone.

The speaker-microphone set 10 comprises a microphone 11, a speaker 12, and a PTT circuit 13, arranged in such a manner that when the PTT circuit 13 is triggered to activate the microphone 11, the microphone 11 is capable of receiving an audio signal from a user. In one embodiment of the present disclosure, the speaker-microphone set 10 activates an available channel in a communication system, such as for example a two-way radio system, wherein when the PTT circuit 13 is triggered, the microphone 11 is ready to receive an audio signal, and transmit the audio signal to the communication system through the RF transceiver 20.

The RF transceiver 20 of the position reporting microphone is a wireless communications device adapted to send and receive electromagnetic signals, wherein the RF transceiver 20 functions as a communication link between the position reporting microphone and the communication system. In one embodiment, the RF transceiver 20 unit is external to the position reporting microphone housing. The position reporting microphone provides a baseband output, which is fed into the RF transceiver 20, wherein the baseband output modulates an RF carrier waveform, in preparation for transmission, which is then broadcast to the communication system via the RF transceiver 20.

In one embodiment, a data manager 60 processes position and identification signals into a digital format. A data converter 70 converts digital data into baseband audio signals. In one embodiment, the data converter 70 comprises a data packet modem, such as for example a half-duplex data modem. A baseband audio signal processor 80 functions to generate a composite audio signal and position and/or identification signal. The baseband audio signal processor 80 generates a baseband audio/position/identification signal in at least one of three ways. In one embodiment, a position/identification signal is prepended to an audio signal. In another embodiment, the position/identification signal is appended to the audio signal. In yet another embodiment, the position/identification signal is parsed into discrete components and "spliced" or integrated into the audio signal at periodic time intervals, as will be readily appreciated by those of ordinary skill in the art.

The RF transceiver 20 can be automatically or manually tuned to communicate with another communication system by matching the same RF frequency. That is, more than one position reporting microphone can be set to use the same radio frequency by the manufacturer or security service company. Alternatively, the user is able to manually tune the RF transceiver 20 to communicatively network with another desirable communication system or automatically tune the RF transceiver 20 to search another communication system that is available within the same coverage area.

The position acquisition controller 30 comprises means 31 for receiving positioning data from an external position transponder system, such as an external GPS satellite. In one embodiment, the position acquisition controller 30 comprises a GPS controller. A signal converter 32 is arranged to convert the positioning data into a quantity of positioning digital data, which is then fed to the data manager 60. The data manager 60 functions to parse the quantity of positioning digital data into a format useable by other system components, such as for example, the baseband audio signal processor 80 and/or a data modem 5. In one embodiment, the well-known interface standard, NMEA-0183, is the digital data signal parsed by the data manager 60.

A means for receiving signals from free-space, according to one embodiment of the present teachings, is a position information receptor 31, such as a GPS antenna, adapted for wirelessly communicating with one or more GPS satellites so as to receive data therefrom. In one embodiment, the position acquisition controller 30 assumes NMEA-0183 message formats. Alternate GPS message formats, such as Trimble's proprietary TSIP format may be readily adapted for use, as will be appreciated by one of ordinary skill in the art. In addition to GPS protocols, other positioning systems, such as for example IMU, are also supported by the architecture of the present disclosure. The position information receptor 31 is interchangeable in the event other wireless messaging formats are desired to be used with the present disclosure.

In one embodiment, the position information receptor 30 of the position acquisition controller 30 is a GPS antenna, comprising a ground conductive plate of approximately square shape, radiation patch plate and dielectric sandwiched between the ground conductive plate and the radiation patch plate. The GPS antenna is mounted on a printed circuit board of approximately square shape, the width of which is about the same as that of the ground conductive plate and the length of which is longer than that of the ground conductive plate. The print board serves as a reflector of the GPS antenna.

The position reporting microphone further comprises a portable case 101, which houses the RF transceiver 20 and a power supply 102. An audio basedband output port is provided on the portable case 101 for transmitting a baseband audio output. Additionally, an RF port is provided on the portable case 101 for connection to a two-way radio. According to one embodiment of the present teachings, the power supply 102 of the GPS microphone comprises a rechargeable battery disposed in the portable case 101, wherein the rechargeable battery is electrically connected to the speaker-microphone set 10 to supply electrical power as needed.

As shown in FIG. 2, one embodiment of the present disclosure provides a process of transmitting the positioning data from the position reporting microphone to the communication system, which comprises the STEPS of:

(1) communicatively networking an RF transceiver 20 to a communication system;

(2) activating, inter alia, a position acquisition controller 30, a data manager 60, a data converter 70, and a baseband audio signal processor 80 to encode the positioning and/or identification data onto a baseband signal, which is subsequently employed to modulate an RF carrier waveform, thus forming an encoded RF positioning signal;

(3) activating the RF transceiver 20 to transmit the encoded RF positioning signal to the communication system.

In STEP (1), the RF transceiver 20 is within a geographical area covered by a particular communication system, such that the position reporting microphone is in range of the particular communication system and capable of connecting to the communication system via the RF transceiver 20. Once a communication channel is established with the communication system, the RF transceiver 20 is capable of broadcasting a user's audio transmissions, and also of broadcasting an encoded RF positioning signal (containing, for example, position and/or identification data from the position reporting microphone).

In STEP (2), according to one exemplary embodiment of the present teachings, the position acquisition controller 30 is activated when the PTT circuit 13 of the speaker-microphone set 10 is triggered. In one embodiment, audio information input by a user to the speaker-microphone set 10 is combined with a quantity of position information (e.g., GPS location data), as described above (e.g., appended, prepended, spliced) to compose an encoded audio/position baseband signal. In one embodiment, identification information is also combined with the audio/position baseband signal to form an encoded audio/position/identification baseband signal. One purpose of the identification signal is to identify a specific position reporting microphone (e.g., GPS microphone), when a plurality of position reporting microphones are simultaneously accessing the same communications system. Combining of the audio, position, and identification signals is facilitated via a data manager 60, a data converter 70, and a baseband audio signal processor 80, as will be appreciated by those of ordinary skill in the art. Subsequently, the encoded audio/position baseband signal (alternatively the audio/position/identification baseband signal) is upconverted (i.e., mixed with a carrier waveform) to form an RF positioning signal.

In one embodiment, the position acquisition controller 30 (e.g., GPS controller) is adapted to be preset to be automatically activated for receiving positioning data for a period of time in STEP (2). In one exemplary embodiment, a user presets the position acquisition controller 30 to receive the positioning data every ten minutes. In this embodiment, when the RF positioning signal is encoded and upconverted, the RF transmitter 20 is ready to transmit the RF positioning signal to the communication system, irrespective of whether an audio signal has been received from the speaker-microphone set 10.

In yet another embodiment of the present teachings, the position acquisition controller 30 is adapted to be activated when a request is sent from the communication system. In this exemplary embodiment, a request signal is sent from the communication system to the position reporting microphone and is received by the RF transceiver 20. The request signal functions to activate the position acquisition controller 30 to receive positioning data. Such positioning data is subsequently prepared for transmission (as described above) and an RF positioning signal is thereafter transmitted to the communication system. When a user is unable to manually activate the position acquisition controller 30, the communication system is capable of remotely controlling the activation of the position acquisition controller 30 to track the location of the user. In one embodiment, the position acquisition controller 30 is manually activated by a user by activating a switch on the position acquisition controller 30, such as for example by pressing an activation button.

According to one embodiment, the communication system comprises, inter alia, a control center 40, and a processor center 50. The control center 40 comprises signal receiving means 41 and signal decoding means 42. The signal receiving means 41 receives an RF positioning signal broadcasted by the RF transceiver 20, and functions to downconvert the RF positioning signal to baseband frequencies. The downconverted RF positioning signal is then transferred to the signal decoding means 42. The signal decoding means 42 functions to decode and parse the RF positioning signal, into baseband audio and data (e.g., position and identification data).

The processor center 50 converts the position and/or identification data into computer readable data, in order to associate a particular position reporting microphone within the coverage area of the communication system with a specific identification code and specific positioning data (e.g., GPS location data).

In one exemplary embodiment of the present teachings, shown in FIG. 1, a police officer carries a position reporting microphone on his person, and a communication system is installed in the police squad car. When an officer moves away from the squad car, a communication network is established between the RF transceiver 20 and the squad car communication system. Hence, another police officer, remaining inside the squad car will readily be able to track the other police officer moving away from the squad car.

In yet another embodiment, shown in FIG. 3, a control center 40 is installed inside a police squad car, and the processor center 50 is located at a police station. The police officer carrying the position reporting microphone is able to send and receive audio tones to and from the police station via normal two-way radio means available on the position reporting microphone, and approximately simultaneously, position data for that police officer is transmitted by the position reporting microphone to the processor center 50, via the control center 40 as described above.

In one illustrative exemplary embodiment, a connector element 3 is disposed on the position reporting microphone of the present disclosure. The connector element 3 provides one or more of the following functionalities:
1.) charging the position reporting microphone;
2.) inputting data to the position reporting microphone;
3.) outputting data from the position reporting microphone (e.g., for connecting to a monitor, pda, computer, etc. . . . );
4.) importing audio;
5.) exporting audio; and,
6.) programming the position reporting microphone.

Those skilled in the wireless communications art will appreciate that the present teachings may be practiced with other system configurations, including hand-held devices, multiprocessor systems, microprocessor-based or programmable consumer electronics, network PC's, minicomputers, mainframe computers, and the like. The present teachings may also be practiced in distributed computing environments where tasks are performed by remote processing devices that are linked through a communications network. In a distributed computing environment, program modules may be located in both local and remote memory storage devices.

The communication systems described herein above may operate in a networked environment using logical connections to one or more remote computers. These logical connections can be achieved using a communication device that is coupled to or be a part of the computer; the present teachings are not limited to a particular type of communications device. The remote computer may be another computer, a server, a router, a network PC, a client, a peer device or other common network node, and typically includes many or all of the elements described above relative to the computer. The logical connections include a local-area network (LAN) and a wide-area network (WAN). Such networking environments are commonplace in office networks, enterprise-wide computer networks, intranets and the Internet, which are all types of networks.

When used in a LAN-networking environment, the computer is connected to the local network through a network interface or adapter, which is one type of communications device. When used in a WAN-networking environment, the computer typically includes a modem, a type of communications device, or any other type of communications device for establishing communications over the wide area network, such as the Internet.

The foregoing description illustrates exemplary implementations, and novel features, of aspects of an apparatus for broadcasting positioning information. Alternative implementations are suggested, but it is impractical to list all alternative implementations of the present teachings. Therefore, the scope of the presented disclosure should be determined only by reference to the appended claims, and should not be limited by features illustrated in the foregoing description except insofar as such limitation is recited in an appended claim.

While the above description has pointed out novel features of the present disclosure as applied to various embodiments, the skilled person will understand that various omissions, substitutions, permutations, and changes in the form and details of the present teachings illustrated may be made without departing from the scope of the present teachings.

Each practical and novel combination of the elements and alternatives described hereinabove, and each practical combination of equivalents to such elements, is contemplated as an embodiment of the present teachings. Because many more element combinations are contemplated as embodiments of the present teachings than can reasonably be explicitly enumerated herein, the scope of the present teachings is properly defined by the appended claims rather than by the foregoing description. All variations coming within the meaning and range of equivalency of the various claim elements are embraced within the scope of the corresponding claim. Each claim set forth below is intended to encompass any apparatus or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art. Furthermore, to the extent that the term "includes" is used in either the detailed description or the claims, such term is intended to be inclusive in a manner similar to the term "comprising".

What is claimed is:

1. A system for communicating information in a wireless network between at least one user and a communication system, comprising:
   a) a position reporting microphone, comprising:
      i) a speaker-microphone set, comprising:
         (A) a speaker element operatively coupled to a microphone element;
         (B) a PTT circuit member, electrically connected to the microphone element, wherein the PTT circuit member is adapted to electrically activate the microphone element;
      ii) a position acquisition controller, operatively connected to the speaker-microphone set, comprising:
         (A) a position information receptor, adapted to receive positioning data from at least one external transponder system;
         (B) a signal converter, operatively coupled to the position information receptor, wherein the signal converter converts the positioning data received by the position information receptor into a quantity of positioning digital data;
      iii) a data manager element electrically coupled to the position acquisition controller, wherein the data manager is adapted to parse the quantity of positioning digital data into a digital format, and;
   b) an existing two-way radio operatively coupled to the position reporting microphone, wherein the existing two-way radio is external to the position reporting microphone, wherein the position reporting microphone is adapted to be wirelessly connected to the existing two-way radio.

2. The system for communicating of claim 1, wherein the data manager output is adapted to provide a baseband output suitable to modulate an RF carrier waveform.

3. The system for communicating of claim 2, wherein a composite signal generated by the baseband audio signal processor element comprises audio and position data.

4. The system for communicating of claim 2, wherein the baseband output comprises a signal having a portion of information selected from the group consisting of:
   a. a portion of audio data;
   b. a portion of position data, or;
   c. a portion of identification data.

5. The system for communicating of claim 4, wherein the baseband output comprises a signal having a portion of information selected from the group consisting of:
   a. a portion of audio data;
   b. a portion of position data, or;
   c. a portion of identification data.

6. The system for communicating of claim 5, wherein the data manager is further operatively coupled to an identification data element, wherein the identification data element is adapted to provide specific identification data for a particular position reporting microphone.

7. The system for communicating of claim 6, wherein the data manager is further operatively coupled to an identification data element, wherein the identification data element is adapted to provide specific identification data for a particular position reporting microphone.

8. The system for communicating of claim 7, wherein the data manager is further operatively coupled to an identification data element, wherein the identification data element is adapted to provide specific identification data for a particular position reporting microphone.

9. The system for communicating of claim 1, wherein the data manager is operatively coupled to a data converter element, wherein the data converter element is adapted to convert digital data into baseband audio signals.

10. The system for communicating of claim 1, wherein a composite signal generated by the baseband audio signal processor element comprises audio and position data.

11. The system for communicating of claim 10, wherein the composite signal generated by the baseband audio signal processor element further comprises an identification signal.

12. The system for communicating of claim 3, wherein the composite signal generated by the baseband audio signal processor element further comprises an identification signal.

13. The system for communicating of claim 1, wherein the position information receptor comprises a GPS antenna.

* * * * *